United States Patent
Kim et al.

(10) Patent No.: US 9,823,746 B2
(45) Date of Patent: Nov. 21, 2017

(54) METHOD FOR CONTROLLING FUNCTION AND ELECTRONIC DEVICE THEREOF

(71) Applicant: Samsung Electronics Co., Ltd., Suwon-si, Gyeonggi-do (KR)

(72) Inventors: Kyung-Jung Kim, Suwon-si (KR); Se-Jun Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 14/589,242

(22) Filed: Jan. 5, 2015

(65) Prior Publication Data

US 2015/0192994 A1    Jul. 9, 2015

(30) Foreign Application Priority Data

Jan. 7, 2014 (KR) .................. 10-2014-0001770

(51) Int. Cl.
| | |
|---|---|
| *G08B 17/00* | (2006.01) |
| *G06F 3/01* | (2006.01) |
| *G08B 21/02* | (2006.01) |
| *G06F 1/16* | (2006.01) |
| *G08B 21/18* | (2006.01) |

(52) U.S. Cl.
CPC ............ *G06F 3/014* (2013.01); *G06F 1/16* (2013.01); *G08B 21/02* (2013.01); *G08B 21/182* (2013.01)

(58) Field of Classification Search
CPC .......... G06F 3/014; G06F 1/16; G08B 21/02; G08B 21/182
USPC ........................................................ 340/586
See application file for complete search history.

(56) References Cited

U.S. PATENT DOCUMENTS

| | | | |
|---|---|---|---|
| 6,222,114 B1* | 4/2001 | Mitamura ............. | G04C 10/00 136/205 |
| 2007/0016638 A1* | 1/2007 | Elbury ..................... | G06F 8/65 709/201 |
| 2010/0199485 A1* | 8/2010 | Dell ......................... | F16B 2/02 29/525.09 |
| 2012/0210214 A1* | 8/2012 | Yoo ....................... | G06F 3/0482 715/702 |
| 2013/0106603 A1* | 5/2013 | Weast ..................... | G06F 1/163 340/539.11 |

(Continued)

FOREIGN PATENT DOCUMENTS

| | | |
|---|---|---|
| JP | 2007074095 A | 3/2007 |
| KR | 20010106959 | 4/2002 |

*Primary Examiner* — Zhen Y Wu
(74) *Attorney, Agent, or Firm* — Jefferson IP Law, LLP

(57) ABSTRACT

A method of controlling a function of an electronic device is provided. The method includes determining whether a human body of a user is in contact with the electronic device, and performing a corresponding function if the human body of the user is in contact with the electronic device. The determination of whether the human body of the user is in contact with the electronic device is based at least in part on whether an image pattern of the human body of the user, which is detected by the image sensor, a temperature pattern of the electronic device, which is detected by the temperature sensor, and a resistance pattern of the human body of the user, which is detected by the body conductivity sensor, respectively correspond to a reference image pattern, a reference temperature pattern, and a reference resistance pattern.

17 Claims, 13 Drawing Sheets

(56) References Cited

U.S. PATENT DOCUMENTS

| | | | |
|---|---|---|---|
| 2013/0119255 A1* | 5/2013 | Dickinson | G04G 21/00 250/340 |
| 2014/0078049 A1* | 3/2014 | Parshionikar | G06F 3/017 345/156 |
| 2014/0100707 A1* | 4/2014 | Yu | A61B 5/02438 700/297 |
| 2014/0107493 A1* | 4/2014 | Yuen | H04W 4/027 600/473 |
| 2014/0112371 A1* | 4/2014 | Yang | G01K 7/00 374/163 |
| 2014/0119531 A1* | 5/2014 | Tuchman | H04M 3/5166 379/265.09 |
| 2014/0191873 A1* | 7/2014 | Kreiner | H04M 1/72569 340/604 |
| 2014/0196131 A1* | 7/2014 | Lee | G06F 21/32 726/7 |
| 2014/0267076 A1* | 9/2014 | Birnbaum | B25J 13/025 345/173 |
| 2015/0173674 A1* | 6/2015 | Hayes | A61B 5/681 600/301 |
| 2015/0182130 A1* | 7/2015 | Utter, II | A61B 5/0205 600/483 |
| 2015/0220109 A1* | 8/2015 | von Badinski | G01P 15/00 340/539.12 |
| 2015/0332107 A1* | 11/2015 | Paniaras | G06F 3/0488 715/765 |
| 2015/0342524 A1* | 12/2015 | Sudo | G06F 21/35 340/870.07 |

\* cited by examiner

METHOD FOR CONTROLLING FUNCTION AND ELECTRONIC DEVICE THEREOF

CROSS-REFERENCE TO RELATED APPLICATION(S)

This application claims the benefit under 35 U.S.C. §119 (a) of a Korean patent application filed on Jan. 7, 2014 in the Korean Intellectual Property Office and assigned Serial number 10-2014-0001770, the entire disclosure of which is hereby incorporated by reference.

TECHNICAL FIELD

The present disclosure relates to an apparatus and method for controlling a function by using a human body contact in an electronic device.

BACKGROUND

With the advance of information communication techniques and semiconductor techniques, various electronic devices are under development into multimedia devices for providing various multimedia services. For example, the electronic device may provide various multimedia services such as a messenger service, a broadcast service, a wireless Internet service, a camera service, and a music play service.

Such electronic devices are getting slimmer, and are being developed into human body contact type electronic devices (e.g., a wearable device, and/or the like) which have an advantage in portability. For example, the human body contact type electronic device implies an electronic device which is worn on a part of a physical body of a user or directly in contact with a skin to improve portability.

However, because the electronic device is in contact with the physical body of the user for a long time period, the user is exposed to a low temperature burn risk and an explosion risk. Further, although there is a technique of decreasing a surface temperature by temporarily decreasing a performance of a Central Processing Unit (CPU) to avoid the low temperature burn, this results in a problem of a performance deterioration of the electronic device. Furthermore, the electronic device causes unnecessary power consumption even in a state in which the electronic device is separated from the physical body of the user. In addition, an alarm cannot be recognized when the electronic device is worn due to an output strength (e.g., a vibration strength, and/or the like) determined irrespective of whether the user wears the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a function control method in which an electronic device controls a function by using a human body contact, and the electronic device thereof.

Another aspect of the present disclosure is to provide a function control method in which an electronic device outputs an alert message step by step by detecting in advance a low temperature burn risk and an explosion risk by using a human body contact, and the electronic device thereof.

Another aspect of the present disclosure is to provide a function control method in which an electronic device transforms a shape of the electronic device step by step by detecting in advance a low temperature burn risk and an explosion risk by using a human body contact, and the electronic device thereof.

Another aspect of the present disclosure is to provide a function control method in which an electronic device effectively utilizes power by using a human body contact, and the electronic device thereof.

Another aspect of the present disclosure is to provide a function control method in which an electronic device effectively provides an alarm to a user by using a human body contact, and the electronic device thereof.

In accordance with an aspect of the present disclosure, a method of controlling a function of an electronic device having a temperature sensor and a body conductivity sensor is provided. The method includes determining whether a human body of a user is in contact with the electronic device, and performing a corresponding function if the human body of the user is in contact with the electronic device. The determination of the human body of the user is in contact with the electronic device may be based at least in part on whether an image pattern of the human body of the user, which is detected by the image sensor, a temperature pattern of the electronic device, which is detected by the temperature sensor, and a resistance pattern of the human body of the user, which is detected by the body conductivity sensor, respectively correspond to a reference image pattern, a reference temperature pattern, and a reference resistance pattern.

In accordance with another aspect of the present disclosure, an electronic device is provided. The electronic device includes a sensor module having a temperature sensor and a body conductivity sensor, a memory, and a processor configured to determine whether a human body of a user is in contact with the electronic device and to perform a corresponding function if the human body of the user is in contact with the electronic device. The processor may determine whether the human body of the user is in contact with the electronic device based at least in part on whether an image pattern of the human body of the user, which is detected by the image sensor, a temperature pattern of the electronic device, which is detected by the temperature sensor, and a resistance pattern of the human body of the user, which is detected by the body conductivity sensor, respectively correspond to a reference image pattern, a reference temperature pattern, and a reference resistance pattern.

In accordance with another aspect of the present disclosure, a method for operating an electronic device having a sensor module is provided. The method includes determining whether the electronic device is one or more of worn by a user and in contact with a user using an input from the sensor module, and in response to determining that the electronic device is one or more of worn by a user and in contact with the user, performing a function associated with one or more of changing a power consumed by the electronic device and changing a temperature of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
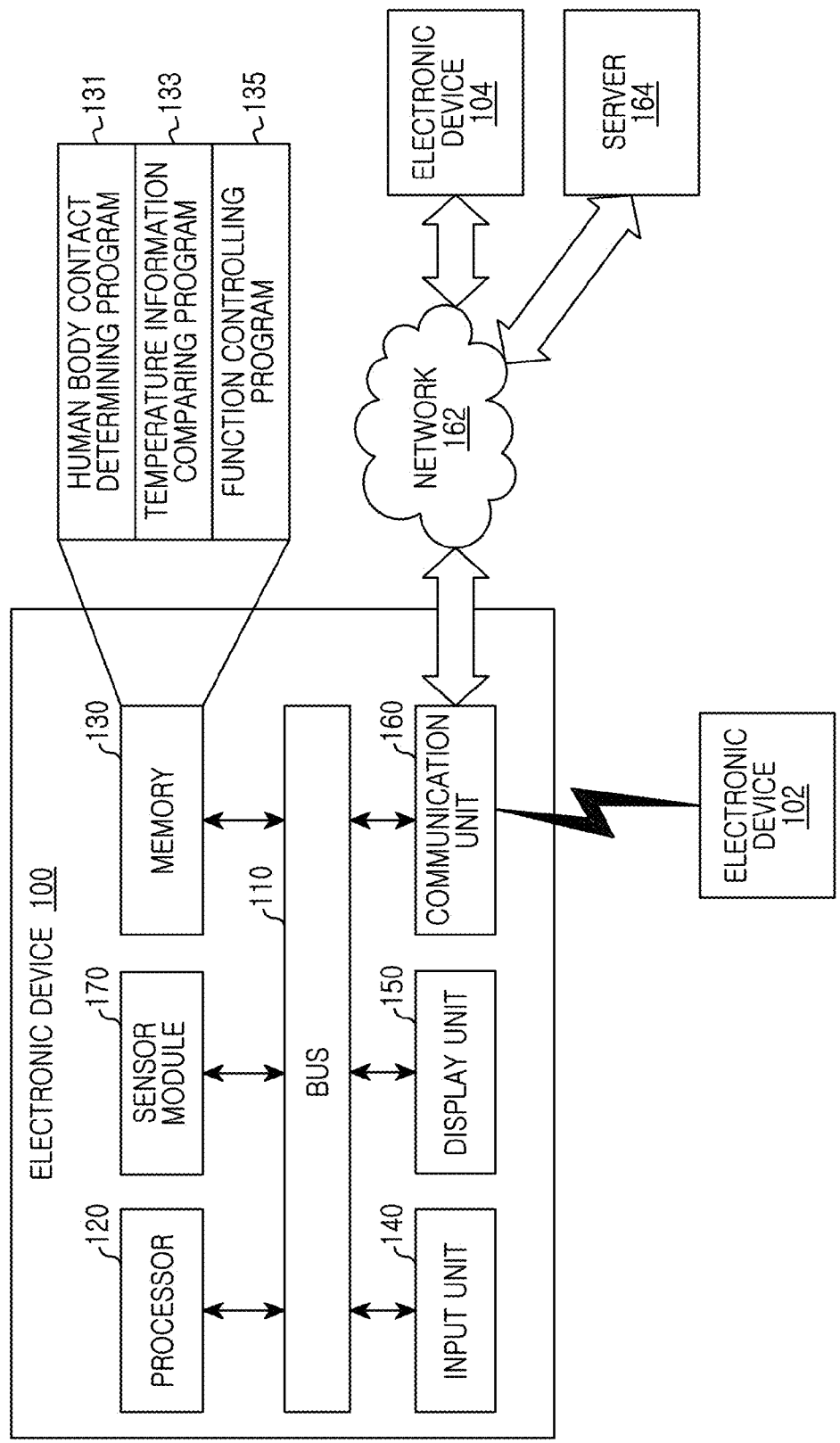
FIG. 1 is a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "include" or "may include" used in the various embodiments of the present disclosure is intended to indicate a presence of a corresponding function, operation, or element disclosed herein, and the expression is not intended to limit a presence of one or more functions, operations, or components. In addition, in the various embodiments of the present disclosure, the term "include" or "have" is intended to indicate that characteristics, numbers, steps, operations, elements, and components disclosed in the specification or combinations thereof exist, and thus should be understood that there are additional possibilities of one or more other characteristics, numbers, steps, operations, elements, components or combinations thereof.

In various embodiments of the present disclosure, an expression "or" includes any and all combinations of words enumerated together. For example, "A or B" may include A or B, or may include both of A and B.

Although expressions used in various embodiments of the present disclosure such as "$1^{st}$", "$2^{nd}$", "first", "second" may be used to express various elements of the various embodiments of the present disclosure, it is not intended to limit the corresponding elements. For example, the above expressions are not intended to limit an order or an importance of the corresponding elements. The above expressions may be used to distinguish one element from another element. For example, a $1^{st}$ user device and the $2^{nd}$ user device are both user devices, and indicate different user devices. For example, a $1^{st}$ element may be termed a $2_{nd}$ element, and similarly, the $2^{nd}$ element may be termed the $1^{st}$ element without departing from the scope of the various embodiments of the present disclosure.

When a element is mentioned as being "connected" to or "accessing" another element, this may mean that it is directly connected to or accessing the other element, but it is to be understood that there are no intervening elements present. In contrast, when a element is mentioned as being "directly connected" to or "directly accessing" another element, it is to be understood that there are no intervening elements present.

The terminology used in various embodiments of the present disclosure is for the purpose of describing particular embodiments only and is not intended to be limiting of the various embodiments of the present disclosure. A singular expression includes a plural expression unless there is a contextually distinctive difference therebetween.

Unless otherwise defined, all terms (including technical and scientific terms) used herein have the same meaning as commonly understood by those ordinarily skilled in the art to which various embodiments of the present disclosure belong. It will be further understood that terms, such as those defined in commonly used dictionaries, should be interpreted as having a meaning that is consistent with their meaning in the context of the relevant art and the various embodiments of the present disclosure, and will not be interpreted in an idealized or overly formal sense unless expressly so defined herein.

An electronic device according to various embodiments of the present disclosure may be a device including a human body recognition function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to various embodiments of the present disclosure, the electronic device may be a smart home appliance having a human body recognition function. For example, the smart home appliance may include at least one of a TV, a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various medical devices (e.g., Magnetic Resonance Angiography (MRA), Magnetic Resonance Imaging (MRI), Computed Tomography (CT), imaging equipment, ultrasonic instrument, and/or the like), a navigation device, a Global Positioning System (GPS) receiver, an Event Data Recorder (EDR), a Flight Data Recorder (FDR), a car infotainment device, an electronic equipment for ships (e.g., a vessel navigation device, a gyro compass, and/or the like), avionics, a security device, a car head unit, an industrial or domestic robot, an Automatic Teller's Machine (ATM) of financial institutions, and Point Of Sales (POS) of shops.

According to various embodiments of the present disclosure, the electronic device may include at least one of a furniture or a part of building/constructions including a communication function, an electronic board, an electronic signature receiving device, a projector, and various measurement machines (e.g., water supply, electricity, gas, propagation measurement machine, and/or the like). The electronic device according to various embodiments of the present disclosure may be one or more combinations of the aforementioned various devices. In addition, the electronic device according to various embodiments of the present disclosure may be a flexible device. It is apparent to those ordinarily skilled in the art that the electronic device according to various embodiments of the present disclosure is not limited to the aforementioned devices.

FIG. 1 is a block diagram of an electronic device according to various embodiments of the present disclosure.

Referring to FIG. 1, an electronic device 100 may include a bus 110, a processor 120, a memory 130, an input unit 140, a display unit 150, a communication unit 160, and a sensor module 170.

The bus 110 may be a circuit for connecting the aforementioned elements (e.g., the processor 120, the memory 130, the input unit 140, the display unit 150, the communication unit 160, and the sensor module 170) and for delivering communication between the aforementioned elements.

The processor 120 may receive an instruction from other elements included in the electronic device 100 via the bus 110, and may interpret the received instruction and execute an arithmetic operation or data processing according to the interpreted instruction. In this case, the processor 120 executes at least one program stored in the memory 130 and provides a service according to the program. For example, the processor 120 may execute a human body contact determining program 131, a temperature information comparing program 133, and a function controlling program 135 to determine whether the electronic device is in contact with a human body, and if the electronic device 100 is determined to be in contact with the human body, may control to perform a corresponding function.

As another example, if the electronic device 100 is determined to be in contact with the human body, the processor 120 may acquire temperature information of the electronic device 100 during a specific time period, and may compare the acquired temperature information with reference temperature information to detect a low temperature burn risk and an explosion risk. In this case, the processor 120 may output an alert message, or may perform a physical control of the electronic device 100. As another example, the processor 120 may adjust a synchronization period of a corresponding application according to whether the human body contact occurs. As another example, the processor 120 may operate in a low power mode if the electronic device 100 is not in contact with the human body. For another example, the processor 120 may increase a vibration strength of the electronic device if the electronic device is in contact with the human body.

In addition, the processor 120 may include one or more Application Processors (APs) or one or more Communication Processors (CPs). The AP and the CP may be included in the processor 120 or may be included respectively in different Integrated Circuit (IC) packages. In addition, the AP and the CP may be included in one IC package.

The AP may control a plurality of hardware or software elements connected to the AP by driving an operating system or an application program, and may process a variety of data including multimedia data and may perform an arithmetic operation. The AP may be implemented with a System on Chip (SoC).

The CP may perform at least a part of a multimedia control function. In addition, the CP may identify and authenticate a terminal in a communication network by using a subscriber identity module (e.g., Subscriber Identity Module (SIM) card). In this case, the CP may provide a service including a voice call, a video call, a text message, or packet data to a user. In addition, the CP may control data transmission/reception of the communication unit 160.

The AP or the CP may load an instruction or data, which is received from each non-volatile memory connected thereto or at least one of different elements, to a volatile memory and may process the instruction or data. The AP or the CP may store data, which is received from at least one of different elements or generated by at least one of different elements, in the non-volatile memory. The CP may perform a function of managing a data link and changing a communication protocol in communication between different electronic devices connected through a network to an electronic device including hardware elements. The CP may be implemented with an SoC.

In addition, the processor 120 may further include a Graphic Processing Unit (GPU).

The memory 130 may store an instruction or data received from one or more elements (e.g., the processor 120, the input unit 140, the display unit 150, the communication unit 160, or the sensor module 170) or generated by the one or more elements.

The memory 130 stores one or more programs for a service of the electronic device 100. For example, the memory 130 may include the human body contact determining program 131, the temperature information comparing program 133, and the function controlling program 135.

In this case, each program may be configured with a programming module, and each programming module may be configured in software, firmware, hardware, or at least two or more of combinations thereof.

The human body contact determining program 131 may include at least one software element for determining whether the electronic device is in contact with the human body. In this case, the human body contact determining program 131 may use an image sensor to determine whether the human body contact occurs. For example, the human body contact determining program 131 may capture an image pattern which is a feature of a part of a physical body of a user. The human body contact determining program 131 may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the human body contact determining program 131 may determine whether the human body contact occurs by using two or more body conductivity sensors. For example, if the electronic device is a wrist wearable type, the human body contact determining program 131 may measure a resistance by using two body conductivity sensors spaced apart by a specific distance from each other. The human body contact determining program 131 may determine whether the human body contact occurs, by confirming a resistance measurement value measured by using the body conductivity sensor.

As another example, the human body contact determining program 131 may determine whether the human body contact occurs, by combining at least two of a proximity sensor, an illumination sensor, a temperature sensor, and a humidity sensor. For example, the human body contact determining program 131 may use the proximity sensor to determine that an object exists nearby, and may determine whether the human body contact occurs by using the proximity sensor, the determination as to whether an object exists nearby, and/or the like. In addition, the human body contact determining program 131 may use the illumination sensor to measure an illumination at a time when the object is located nearby, and thus may determine whether the human body contact occurs. In addition, the human body contact determining program 131 may use the temperature or humidity sensor disposed at a portion which is in contact with a human body to recognize a measured temperature change or humidity change, and thus may determine whether the human body contact occurs. The human body contact determining program 131 may determine whether the human body contact occurs by combining at least one of the aforementioned sensors. However, various embodiments of the present disclosure are not limited thereto, and thus various methods may exist to determine whether the human body contact occurs.

In addition, the human body contact determining program 131 may determine not only whether the electronic device is in contact with the human body but also whether the user wears the electronic device. In this case, the human body contact determining program 131 may use a user's hair, a shape or texture of clothes frequently worn, and/or the like, to determine whether the electronic device is worn according to the aforementioned method.

The temperature information comparing program 133 may include at least one software element for comparing temperature information of the electronic device and reference temperature information. For example, the temperature information comparing program 133 may use a temperature sensor or thermometer disposed at a position which is in contact with the human body, and may acquire a temperature value of the electronic device and a temperature change value during a specific time period. The temperature information comparing program 133 may compare the acquired temperature value of the electronic device or the temperature change value during the specific time period with the reference temperature value or the reference temperature change during the specific time period. Through such a comparison, the temperature information comparing program 133 may detect a low temperature burn risk or an explosion risk or the like for the electronic device.

The function control program 135 may include at least one software element for performing a corresponding function according to the human body contact. For example, if information regarding the low temperature burn risk or the explosion risk or the like for the electronic device is provided, the function control program 135 may provide control to output an alert message or to transform the electronic device. In this case, the function control program 135 may output the alert message in various manners. For example, the function control program 135 may generate and/or emit a high-pitched sound (for the user to hear), may provide a vibration, or may display a popup message to a screen. As another example, the function control program 135 may output the alert message step by step. For another example, the function control program 135 may output the alert message by combining the aforementioned methods according to a situation. In addition, the function control program 135 may transform a shape of the electronic device. In this case, the function control program 135 may detach the electronic device from the user, may release a joining member of the electronic device, or may increase a surface area of the electronic device. Because the electronic device is detached or separated from the user in this manner, the function control program 135 may prevent the low temperature burn risk and the explosion risk for the electronic device.

As another example, the function control program 135 may adjust a synchronization period of a corresponding application according to whether the human body contact occurs. If the electronic device is in contact with the human body, the function control program 135 may set a synchronization period to be short as to an application such as an address book, a memo, a Rich Site Summary (RSS) news, a Social Networking Service (SNS), a push message, and/or the like. In addition, if the electronic device is not in contact with the human body, the function control program 135 may set the synchronization period to be long as to the aforementioned applications. For another example, if the electronic device is in contact with the human body, the function control program 135 may set a synchronization period to be long as to an application such as an application update program, a memory clean program, a vaccine program, and/or the like. In addition, if the electronic device is not in contact with the human body, the function control program 135 may set the synchronization period to be short as to the aforementioned applications. For another example, the function control program 135 may select an application of which a synchronization period is adjusted. In this case, the function control program 135 may allow the synchronization period to be adjusted only for a desired application.

As another example, the function control program 135 may operate in a normal mode or a low power mode according to whether the human body contact occurs. The normal mode may include a case of performing at least one operation for providing a user convenience when the user manipulates the electronic device. For example, if the electronic device is in contact with the physical body, the function control program 135 may adjust a brightness of a screen (e.g., Liquid Crystal Display (LCD)) to be bright in the normal mode. As another example, the function control program 135 may increase the clock speed of a CPU in the normal mode so that a processing speed becomes fast. As another example, the function control program 135 may set an auto screen-off time to be long in the normal mode. As another example, the function control program 135 may set a vibration strength to be strong in the normal mode. However, various embodiments of the present disclosure are not limited thereto, and thus various methods for providing user convenience in the electronic device may be provided.

In addition, the low power mode may include a case according to which the electronic device performs at least one operation for decreasing power consumption. For example, the function control program 135 may adjust a brightness of the screen (e.g., LCD) to be dark in the low power mode. As another example, the function control program 135 may decrease the clock speed of a CPU in the low power mode so that a processing speed becomes slow. As another example, the function control program 135 may set an auto screen-off time to be short in the low power mode. As another example, the function control program 135 may set a sleep waiting time to be short in the low power mode. As another example, the function control program 135 may set a vibration strength to be weak in the low power mode. However, various embodiments of the present disclosure are not limited thereto, and thus various methods for effectively utilizing power of a battery in the electronic device may be provided.

In addition, the memory 130 may include an internal memory or an external memory. The internal memory may include at least one of a volatile memory (e.g., a Dynamic Random Access Memory (DRAM), a Static RAM (SRAM), a Synchronous Dynamic RAM (SDRAM), and/or the like) or a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a Mask ROM, a Flash ROM, a Not And (NAND) flash memory, a Not Or (NOR) flash memory, and/or the like). In this case, the internal memory may have a form of a Solid State Drive (SSD). The external memory may further include Compact Flash (CF), Secure Digital (SD), Micro Secure Digital (Micro-SD), Mini Secure digital (Mini-SD), extreme Digital (xD), memory stick, and/or the like.

In addition, the memory 130 may further include a kernel, a middleware, and an Application Programming Interface (API).

The kernel may control or manage system resources (e.g., the bus 110, the processor 120, or memory 130) used to execute an operation or function implemented in the remaining other programming modules (e.g., the middleware, the API, or the application). In addition, the kernel may provide a controllable or manageable interface by accessing individual elements of the electronic device 100 in the middleware, the API, or the application.

The middleware may perform a mediating role so that the API or the application communicates with the kernel to exchange data. In addition, regarding task requests received from at least one application, the middleware may perform load balancing for the task request by using a method of assigning a priority capable of using a system resource (e.g., the bus 110, the processor 120, or memory 130) of the electronic device 100.

The API may include at least one interface or function for file control, window control, video processing, or character control, as an interface capable of controlling a function provided by the application in the kernel or the middleware.

The input unit 140 may transmit an instruction or data generated by a user's selection to the processor 120 or the memory 130 via the bus 110. For example, the input unit 140 may include a touch panel, a pen sensor, a key, an ultrasonic input unit, or other pointer units.

The touch panel may recognize (e.g., detect) a touch input by using at least one of an electrostatic type, a pressure-sensitive type, and an ultrasonic type. The touch panel may further include a controller. In case of the electrostatic type, the touch panel can recognize not only a direct touch but also a proximity touch. The proximity touch is also expressed as a non-contact touch or hovering. The touch panel may further include a tactile layer to provide the user with a tactile reaction.

The display unit 150 may display image, video, data, and/or the like to the user. The display unit 150 may include a touch panel so that an input function and a display function can be performed simultaneously or otherwise concurrently. The touch panel may include an LCD or an Active-Matrix Organic Light-Emitting Diode (AM-OLED), and may be implemented in a flexible, transparent, or wearable manner.

The display unit 150 may include a hologram. The hologram may use an interference of light and show a stereoscopic image in the air. In addition, the display unit 150 may further include a control circuit for controlling the touch panel or the hologram.

The communication unit 160 may connect communication between the electronic device 100 and one or more different electronic devices 102 or 104, a server 164, and/or the like. In this case, the communication unit 160 may support a specific short distance communication protocol (e.g., WiFi, Bluetooth (BT), Near Field Communication (NFC), or specific network communication 162 (e.g., Internet, Local Area Network (LAN), Wide Area Network (WAN), telecommunication network, cellular network, satellite network, Plain Old Telephone Service (POTS), and/or the like)). For example, the electronic device 100 may communicate with one or more electronic devices or the like across a communication network 162.

The sensor module 170 may include at least one of a gesture sensor, a gyro sensor, a pressure sensor, a magnetic sensor, an acceleration sensor, a grip sensor, a proximity sensor, a Red, Green, Blue (RGB) sensor, a bio sensor, a body conductivity sensor, an image sensor, a temperature sensor, a humidity sensor, an illumination sensor, an Ultra Violet (UV) sensor, and/or the like. In addition, the sensor module 170 may measure a physical quantity or detect an operation state of the electronic device 100, and thus may convert the measured or detected information into an electric signal. For example, the sensor module 170 may include an E-nose sensor, an ElectroMyoGraphy (EMG) sensor, an ElectroEncephaloGram (EEG) sensor, an ElectroCardioGram (ECG) sensor, a fingerprint sensor, and/or the like.

Figure 9:
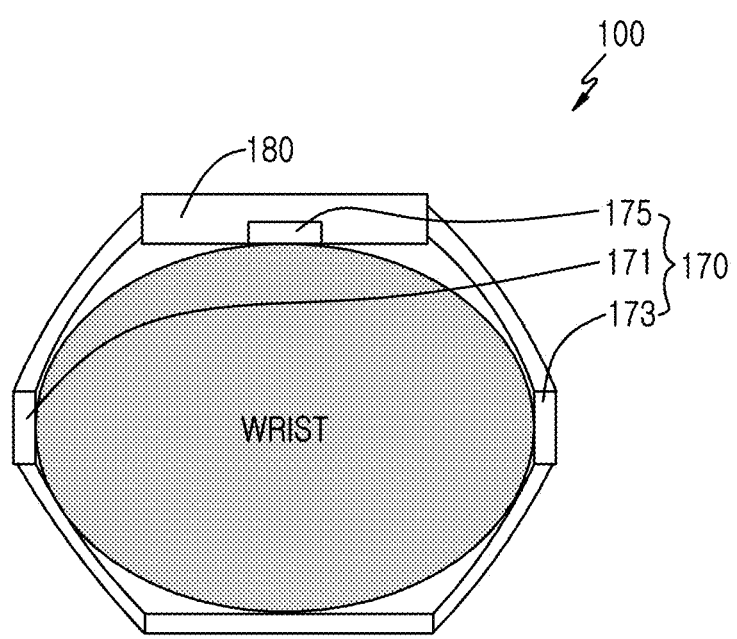
FIG. 9 illustrates a structure for showing a position at which a sensor is attached to an electronic device according to an embodiment of the present disclosure.

FIG. 9 illustrates a structure for showing a position at which a sensor is attached to an electronic device according to an embodiment of the present disclosure.

Referring to FIG. 9, when the electronic device 100 is implemented in a shape of a wrist watch, the sensor module 170 may include at least two human body detection sensors 171 and 173 at a portion which is in contact with a wrist, and may include a temperature sensor 175, installed in a main body portion 180, for acquiring temperature information of the electronic device 100.

Names of elements of the electronic device 100 according to various embodiments of the present disclosure may vary depending on a type of electronic device 100. In addition, the electronic device 100 may include at least one of the aforementioned elements. Some of the elements may be omitted, or additional other elements may be further included.

Figure 2:
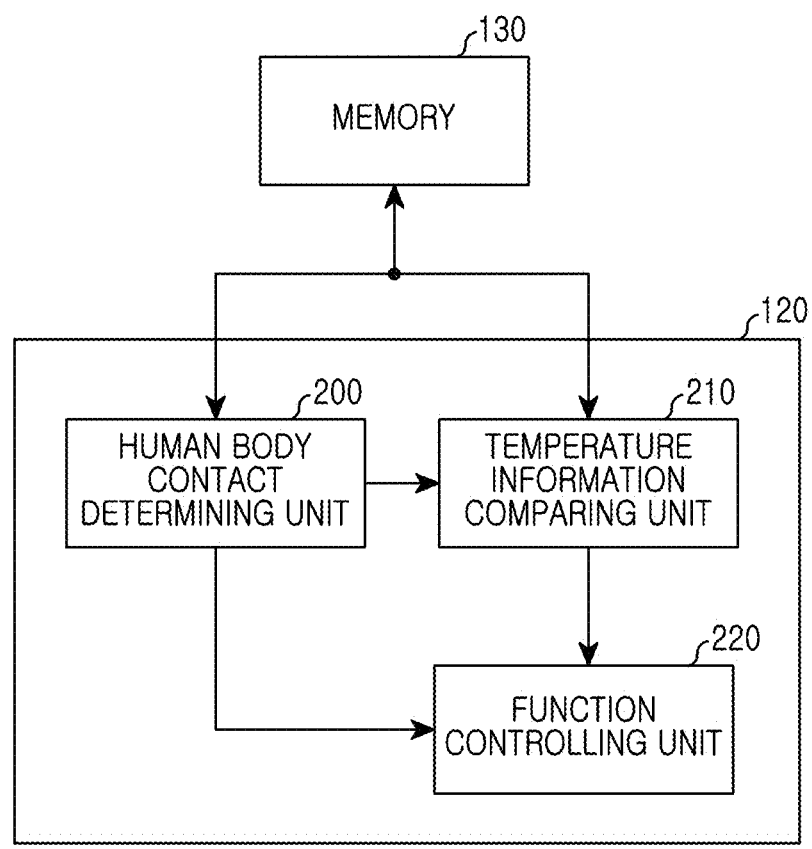
FIG. 2 is a detailed block diagram of a processor according to an embodiment of the present disclosure.

FIG. 2 is a detailed block diagram of a processor according to an embodiment of the present disclosure.

Referring to FIG. 2, the processor 120 may include a human body contact determining unit 200, a temperature information comparing unit 210, and a function controlling unit 220.

The human body contact determining unit 200 may execute the human body contact determining program 131 stored in the memory 130 to determine whether the electronic device is in contact with the human body. In this case, the human body contact determining unit 200 may use an image sensor to determine whether the electronic device is in contact with the human body. For example, the human body contact determining unit 200 may capture an image pattern which is a feature of a part of a physical body of a user. The human body contact determining unit 200 may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the human body contact determining unit 200 may determine whether the human body contact occurs by using two or more body conductivity sensors. For example, if the electronic device is a wrist wearable type, the human body contact determining unit 200 may measure a resistance by using two body conductivity sensors spaced apart by a specific distance from each other. The human body contact determining unit 200 may determine whether the human body contact occurs, by confirming a resistance measurement value measured by using the body conductivity sensor.

As another example, the human body contact determining unit 200 may determine whether the human body contact occurs, by combining at least two of a proximity sensor, an illumination sensor, a temperature sensor, and a humidity sensor. For example, the human body contact determining unit 200 may use the proximity sensor to determine that an object exists nearby, and may determine whether the human body contact occurs by using the proximity sensor, the determination as to whether an object exists nearby, and/or the like. In addition, the human body contact determining unit 200 may use the illumination sensor to measure an illumination at a time when the object is located nearby, and thus may determine whether the human body contact occurs. In addition, the human body contact determining unit 200 may use the temperature or humidity sensor disposed at a portion which is in contact with a human body to recognize a measured temperature change or humidity change, and thus may determine whether the human body contact occurs. The human body contact determining unit 200 may determine whether the human body contact occurs by combining at least one of the aforementioned sensors. However, various embodiments of the present disclosure are not limited thereto, and thus various methods may exist to determine whether the human body contact occurs.

In addition, the human body contact determining unit 200 may execute the human body contact determining program 131 stored in the memory 130 to determine not only whether the electronic device is in contact with the human body but also whether the user wears the electronic device. In this case, the human body contact determining unit 200 may use a user's hair, a shape or texture of clothes frequently worn, and/or the like, to determine whether the electronic device is worn according to the aforementioned method.

The temperature information comparing unit 210 may execute the temperature information comparing program 133 stored in the memory 130 to compare temperature information of the electronic device and reference temperature information. For example, the temperature information comparing unit 210 may use a temperature sensor or thermometer disposed at a position which is in contact with the human body, and may acquire a temperature value of the electronic device and a temperature change value during a specific time period. The temperature information comparing unit 210 may compare the acquired temperature value of the electronic device or the temperature change value during the specific time period with the reference temperature value or the reference temperature change during the specific time period. Through such a comparison, the temperature information comparing unit 210 may detect a low temperature burn risk or an explosion risk and/or the like for the electronic device, and may provide this to the function control unit 220.

The function control unit 220 may execute the function control program 135 stored in the memory 130 to provide a control of performing a corresponding function according to a situation. For example, if information regarding the low temperature burn risk or the explosion risk and/or the like for the electronic device is provided from the temperature information comparing unit 210, the function control unit 200 may provide control to output an alert message or to transform the electronic device. In this case, the function control unit 220 may output the alert message in various manners. For example, the function control unit 220 may generate and/or emit a high-pitched sound (for the user to hear), may provide a vibration, and/or may display a popup message to a screen. As another example, the function control unit 220 may output the alert message step by step. As another example, the function control unit 220 may output the alert message by combining the aforementioned methods according to a situation. In addition, the function control unit 220 may transform a shape of the electronic device. In this case, the function control unit 220 may detach the electronic device from the user, or may release a joining member of the electronic device or may increase a surface area of the electronic device. Because the electronic device is detached or separated from the user in this manner, the function control unit 220 may prevent the low temperature burn risk and the explosion risk for the electronic device.

As another example, the function control unit 220 may adjust a synchronization period of a corresponding application according to whether the human body contact occurs. If the electronic device is in contact with the human body, the function control unit 220 may set a synchronization period to be short as to an application such as an address book, a memo, an RSS news, an SNS, a push message, and/or the like. In addition, if the electronic device is not in contact with the human body, the function control unit 220 may set the synchronization period to be long as to the aforementioned applications. As another example, if the electronic device is in contact with the human body, the function control unit 220 may set a synchronization period to be long as to an application such as an application update program, a memory clean program, a vaccine program, and/or the like. In addition, if the electronic device is not in contact with the human body, the function control unit 220 may set the synchronization period to be short as to the aforementioned applications. As another example, the function control unit 220 may select an application of which a synchronization period is adjusted. In this case, the function control unit 220 may allow the synchronization period to be adjusted only for a desired application.

As another example, the function control unit 220 may operate in a normal mode or a low power mode according to whether the human body contact occurs. The normal mode may include a case of performing at least one operation for providing a user convenience when the user manipulates the electronic device. For example, if the electronic device is in contact with the physical body, the function control unit 220 may adjust a brightness of a screen (e.g., LCD) to be bright in the normal mode. For another example, the function control unit 220 may increase the clock speed of a CPU in the normal mode so that a processing speed becomes fast. As another example, the function control unit 220 may set an auto screen-off time to be long in the normal mode. As another example, the function control unit 220 may set a vibration strength to be strong in the normal mode. However, the present disclosure is not limited thereto, and thus there may be various methods for providing user convenience in the electronic device.

In addition, the low power mode may include a case according which the electronic device performs at least one operation for decreasing power consumption. For example, the function control unit 220 may adjust a brightness of the screen (e.g., LCD) to be dark in the low power mode. As another example, the function control unit 220 may decrease the clock speed of a CPU in the low power mode so that a processing speed becomes slow. As another example, the function control unit 220 may set an auto screen-off time to be short in the low power mode. As another example, the function control unit 220 may set a sleep waiting time to be short in the low power mode. As another example, the function control unit 220 may set a vibration strength to be weak in the low power mode. However, various embodiments of the present disclosure are not limited thereto, and thus various methods for effectively utilizing power of a battery in the electronic device may be provided.

Although elements of the processor 120 may consist of separate modules according to the present embodiment of the present disclosure, the elements may be included as software elements in one module in another embodiment of the present disclosure.

Figure 3:
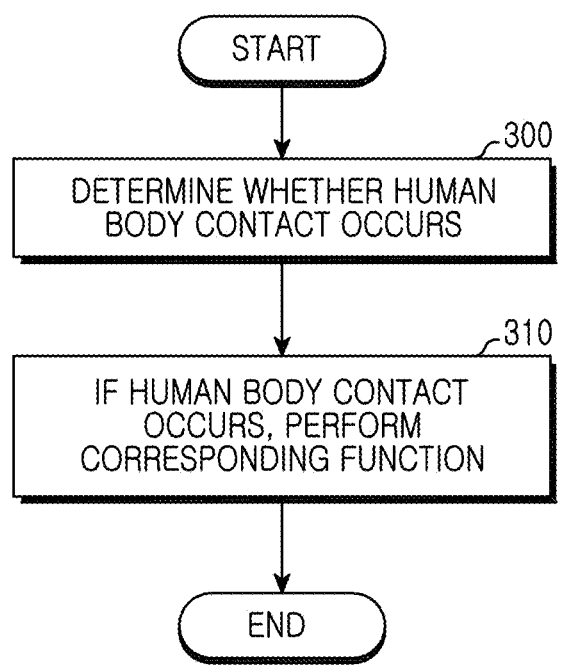
FIG. 3 illustrates a procedure for controlling a function in an electronic device by using a human body contact according to an embodiment of the present disclosure.

FIG. 3 illustrates a procedure for controlling a function in an electronic device by using a human body contact according to an embodiment of the present disclosure.

Referring to FIG. 3, the electronic device determines whether the human body contact occurs in operation 300. In this case, the electronic device may use an image sensor to determine whether the human body contact occurs. For example, the electronic device may capture an image pattern which is a feature of a part of a physical body of a user. The electronic device may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the electronic device may determine whether the human body contact occurs by using two or more body conductivity sensors. For example, if the electronic device is a wrist wearable type, the electronic device may measure a resistance by using two body conductivity sensors spaced apart by a specific distance from each other. The electronic device may determine whether the human body contact occurs, by confirming a resistance measurement value measured by using the body conductivity sensor.

As another example, the electronic device may determine whether the human body contact occurs, by combining at least two of a proximity sensor, an illumination sensor, a temperature sensor, and a humidity sensor. For example, the electronic device may use the proximity sensor to determine that an object exists nearby, and may determine whether the human body contact occurs by using the proximity sensor, the determination as to whether an object exists nearby, and/or the like. In addition, the electronic device may use the illumination sensor to measure an illumination at a time when the object is located nearby, and thus may determine whether the human body contact occurs. In addition, the electronic device may use the temperature or humidity sensor disposed at a portion which is in contact with a human body to recognize a measured temperature change or humidity change, and thus may determine whether the human body contact occurs. The electronic device may determine whether the human body contact occurs by combining at least one of the aforementioned sensors. However, various embodiments of the present disclosure are not limited thereto, and thus various methods to determine whether the human body contact occurs may be provided.

In operation 310, the electronic device may perform a corresponding function when the human body contact occurs. For example, the electronic device may compare temperature information of the electronic device and reference temperature information. The electronic device may use a temperature sensor or thermometer disposed at a position which is in contact with the human body, and may acquire a temperature value of the electronic device and a temperature change value during a specific time period. The electronic device may compare the acquired temperature value of the electronic device or the temperature change value during the specific time period with the reference temperature value or the reference temperature change during the specific time period. Through such a comparison, the electronic device may detect a low temperature burn risk or an explosion risk and/or the like for the electronic device.

As another example, upon detection of the aforementioned low temperature burn risk or explosion risk, the electronic device may provide control to output an alert message and/or to transform the electronic device. In this case, the electronic device may output the alert message in various manners. For example, the electronic device may generate and/or emit a high-pitched sound (for the user to hear), may provide a vibration, may display a popup message to a screen, and/or the like. As another example, the electronic device may output the alert message step by step. As another example, the electronic device may output the alert message by combining the aforementioned methods according to a situation. In addition, the electronic device may transform a shape of the electronic device. In this case, the electronic device may detach the electronic device from the user, or may release a joining member of the electronic device or may increase a surface area of the electronic device. Because the electronic device is detached or separated from the user in this manner, the electronic device may prevent the low temperature burn risk and the explosion risk for the electronic device.

As another example, the function control unit 220 may adjust a synchronization period of a corresponding application according to whether the human body contact occurs. If the electronic device is in contact with the human body, the electronic device may set a synchronization period to be short as to an application such as an address book, a memo, an RSS news, an SNS, a push message, and/or the like. In addition, if the electronic device is not in contact with the human body, the electronic device may set the synchronization period to be long as to the aforementioned applications. As another example, if the electronic device is in contact with the human body, the electronic device may set a synchronization period to be long as to an application such as an application update program, a memory clean program, a vaccine program, and/or the like. In addition, if the electronic device is not in contact with the human body, the electronic device may set the synchronization period to be short as to the aforementioned applications. As another example, the electronic device may select an application of which a synchronization period is adjusted. In this case, the electronic device may allow the synchronization period to be adjusted only for a desired application.

As another example, the electronic device may operate in a normal mode or a low power mode according to whether the human body contact occurs. The normal mode may include a case of performing at least one operation for providing a user convenience when the user manipulates the electronic device. For example, if the electronic device is in contact with the physical body, the electronic device may adjust a brightness of a screen (e.g., LCD) to be bright in the normal mode. As another example, the electronic device may increase the clock speed a CPU in the normal mode so that a processing speed becomes fast. As another example, the electronic device may set an auto screen-off time to be long in the normal mode. As another example, the electronic device may set a vibration strength to be strong in the normal mode. However, various embodiments of the present disclosure are not limited thereto, and thus various methods for providing user convenience in the electronic device may be provided.

In addition, the low power mode may include a case according to which the electronic device performs at least one operation for decreasing power consumption. For example, the electronic device may adjust a brightness of the screen (e.g., LCD) to be dark in the low power mode. As another example, the electronic device may decrease the clock speed of a CPU in the low power mode so that a processing speed becomes slow. As another example, the electronic device may set an auto screen-off time to be short in the low power mode. As another example, the electronic device may set a sleep waiting time to be short in the low power mode. As another example, the electronic device may set a vibration strength to be weak in the low power mode. However, various embodiments of the present disclosure are not limited thereto, and thus various methods for effectively utilizing power of a battery in the electronic device may be provided.

Although it is described in various embodiments of the present disclosure that the electronic device controls the function according to whether the human body contact occurs, the present disclosure is not limited thereto. For example, the electronic device may perform the aforementioned procedure according to whether the user wears the electronic device.

Figure 4:
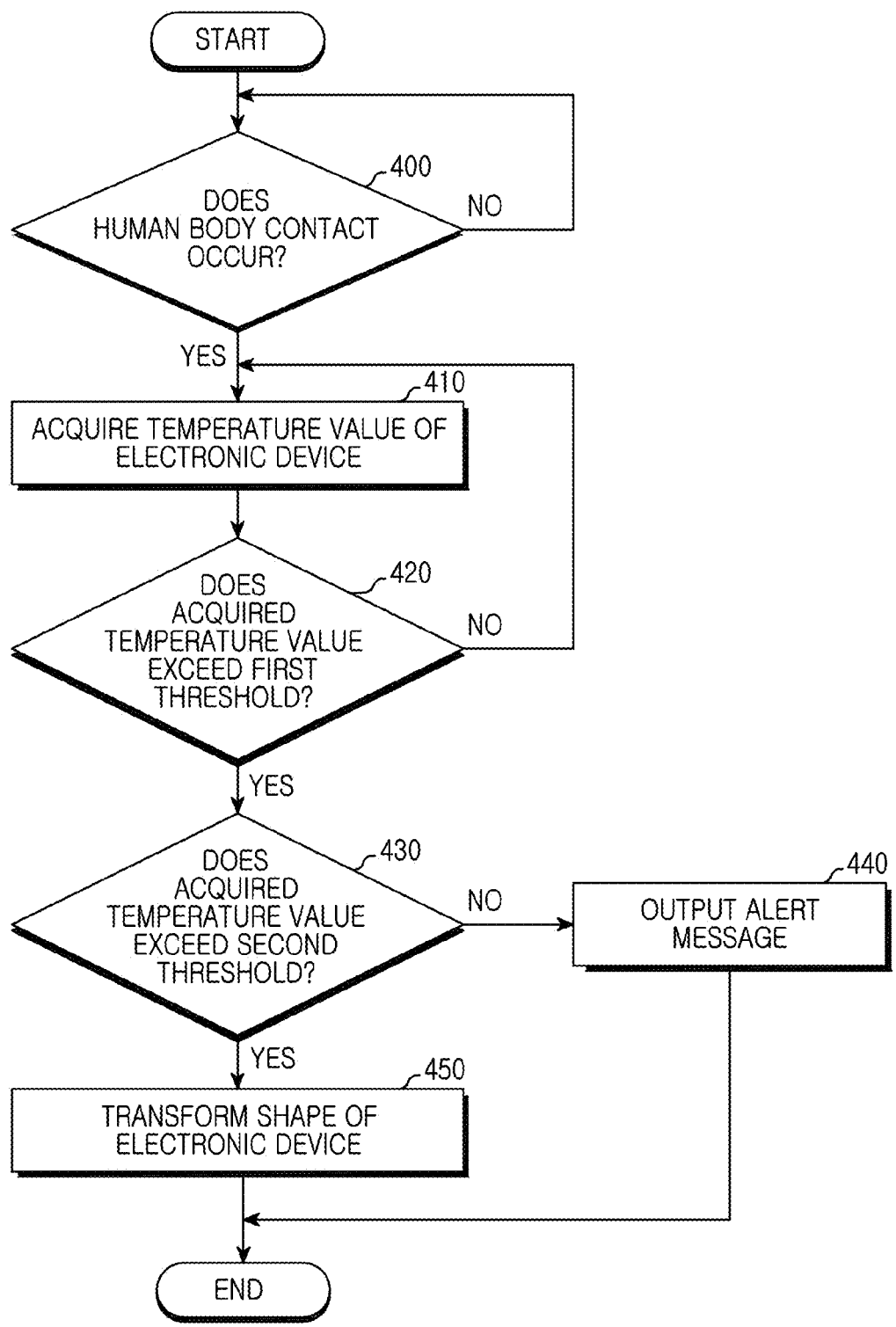
FIG. 4 illustrates a procedure for controlling a function in an electronic device by using a human body contact according to an embodiment of the present disclosure.

FIG. 4 illustrates a procedure for controlling a function in an electronic device by using a human body contact according to an embodiment of the present disclosure.

Referring to FIG. 4, the electronic device determines whether the human body contact occurs in operation 400. In this case, the electronic device may use an image sensor to determine whether the human body contact occurs. For example, the electronic device may capture an image pattern which is a feature of a part of a physical body of a user. The electronic device may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the electronic device may determine whether the human body contact occurs by using two or more body conductivity sensors. For example, if the electronic device is a wrist wearable type, the electronic device may measure a resistance by using two body conductivity sensors spaced apart by a specific distance from each other. The electronic device may determine whether the human body contact occurs, by confirming a resistance measurement value measured by using the body conductivity sensor.

As another example, the electronic device may determine whether the human body contact occurs, by combining at least two of a proximity sensor, an illumination sensor, a temperature sensor, a humidity sensor, and/or the like. For example, the electronic device may use the proximity sensor to determine that an object exists nearby, and may determine whether the human body contact occurs by using the proximity sensor, the determination as to whether an object exists nearby, and/or the like. In addition, the electronic device may use the illumination sensor to measure an illumination at a time when the object is located nearby, and thus may determine whether the human body contact occurs. In addition, the electronic device may use the temperature or humidity sensor disposed at a portion which is in contact with a human body to recognize a measured temperature change or humidity change, and thus may determine whether the human body contact occurs. The electronic device may determine whether the human body contact occurs by combining at least one of the aforementioned sensors. However, the present disclosure is not limited thereto, and thus various methods may exist to determine whether the human body contact occurs.

If the human body contact occurs, the electronic device acquires a temperature value of the electronic device in operation 410. In this case, the electronic device may use a temperature sensor or thermometer disposed at a position which is in contact with the human body and thus may acquire a temperature value.

Figure 10:
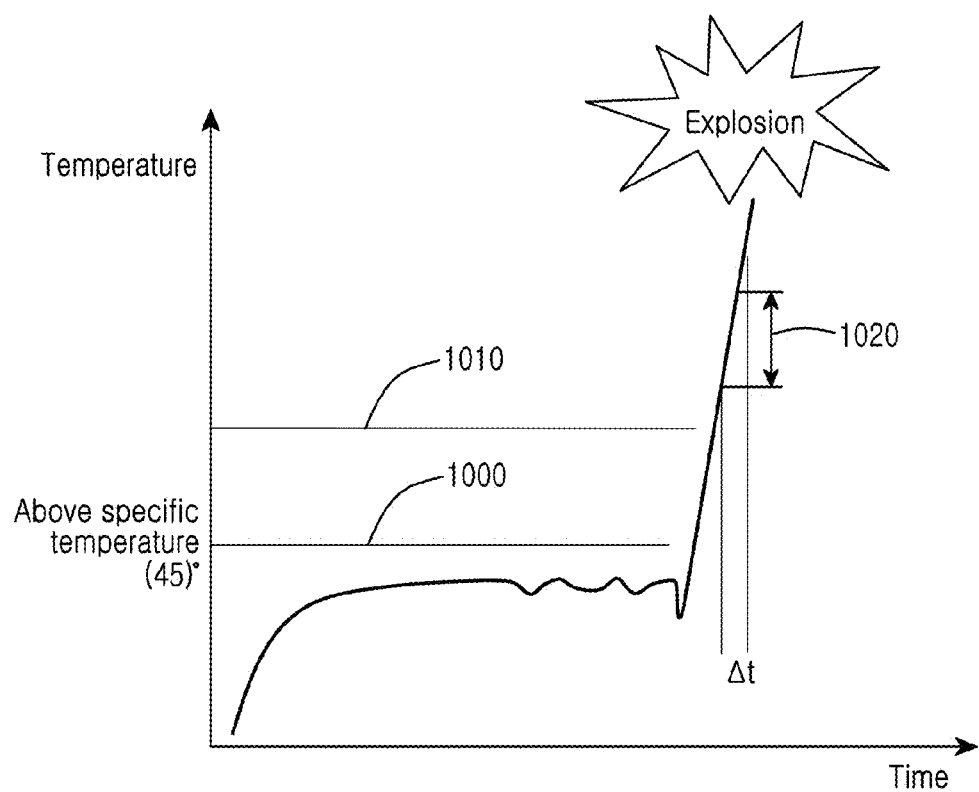
FIG. 10 illustrates a graph showing a temperature change over time in an electronic device according to an embodiment of the present disclosure.

FIG. 10 illustrates a graph showing a temperature change over time in an electronic device according to an embodiment of the present disclosure.

Referring to FIG. 10, the electronic device may use the acquired temperature value to show a temperature graph over time.

In operation 420, the electronic device determines whether the acquired temperature value exceeds a first threshold. For example, the electronic device may determine whether the acquired temperature value of FIG. 10 exceeds a first threshold 1000.

If the acquired temperature value exceeds the first threshold, the electronic device determines whether the acquired temperature value exceeds a second threshold in operation 430. For example, the electronic device may determine whether the acquired temperature value of FIG. 10 exceeds a second threshold 1010.

If the acquired temperature value does not exceed the second threshold, the electronic device may output an alert message in operation 440. In this case, the electronic device may output the alert message in various manners. For example, the electronic device may generate and/or emit a high-pitched sound (for the user to hear), may provide a vibration, or may display a popup message to a screen. As another example, the electronic device may output the alert message step by step. In addition, the electronic device may transform a shape of the electronic device.

If the acquired temperature value exceeds the second threshold, the electronic device transforms a shape of the electronic device in operation 450. In this case, the electronic device may be detached from the user, or a joining member of the electronic device may be released or a surface area of the electronic device may be increased.

Figure 11:
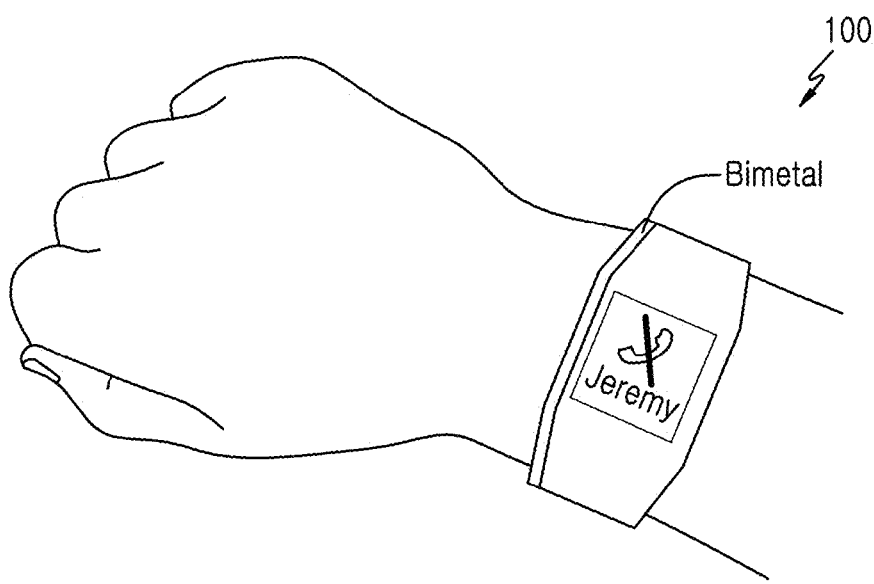
FIG. 11 illustrates a structure for changing a shape of an electronic device by using temperature information in the electronic device according to an embodiment of the present disclosure.

FIG. 11 illustrates a structure for changing a shape of an electronic device by using temperature information in the electronic device according to an embodiment of the present disclosure.

Referring to FIG. 11, if the electronic device has a shape of being wound around a wrist, the electronic device may transform the shape by using a bimetal attached to one side thereof. The bimetal of the electronic device may be bent or curved in a portion thereof upon detection of a high temperature greater than or equal to a specific temperature, so that the electronic device can be detached or separated from the user.

Figure 12:
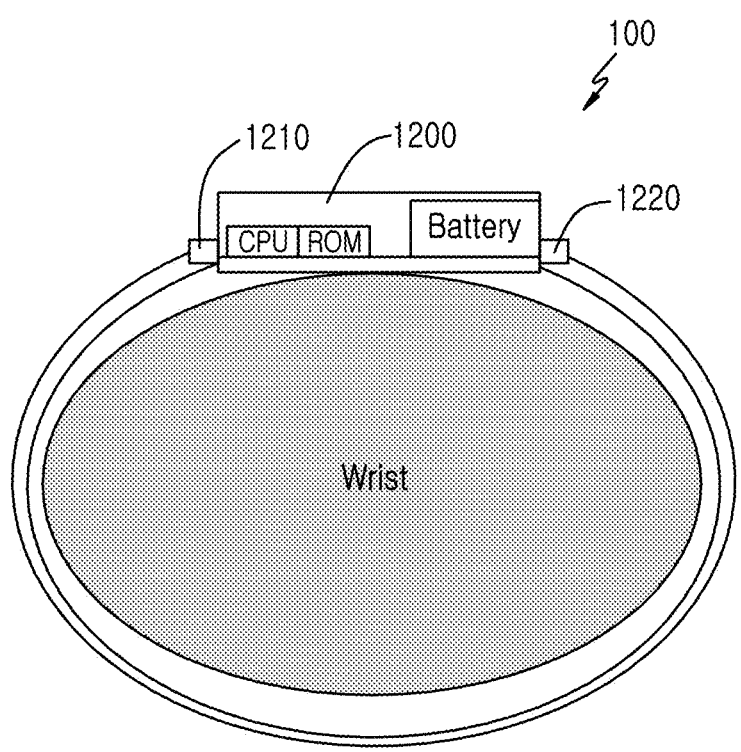
FIG. 12 illustrates a structure for changing a shape of an electronic device by using temperature information in the electronic device according to an embodiment of the present disclosure.

FIG. 12 illustrates a structure for changing a shape of an electronic device by using temperature information in the electronic device according to an embodiment of the present disclosure.

Referring to FIG. 12, if the electronic device includes two joining members 1210 and 1220 disposed at both sides of a main body portion 1200, the electronic device may be detached or separated from the user by releasing a function of at least one joining member 1210 or 1220. The joining members 1210 and 1220 may detach or separate the electronic device from the user with an elastic force using an object such as a spring, a clip, a rubber, and/or the like, upon detection of the high temperature greater than or equal to the specific temperature.

Figure 13:
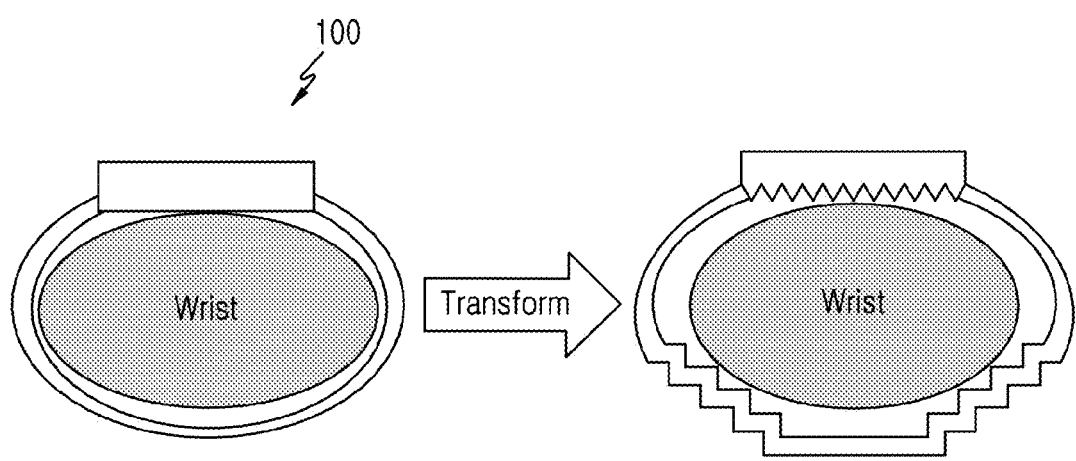
FIG. 13 illustrates a structure for changing a shape of an electronic device by using temperature information in the electronic device according to an embodiment of the present disclosure.

FIG. 13 illustrates a structure for changing a shape of an electronic device by using temperature information in the electronic device according to an embodiment of the present disclosure.

Referring to FIG. 13, the electronic device may transform at least a portion of the electronic device. Upon detection of the high temperature greater than or equal to the specific temperature, the electronic device may transform at least a portion of the electronic device into an uneven shape to increase a surface area. In this case, the electronic device may decrease an area which is in contact with the user and increase an area which is in contact with the air to decrease an influence of a heat generation source.

Although it is described in various embodiments of the present disclosure that the electronic device controls the function according to whether the human body contact occurs, various embodiments of the present disclosure are not limited thereto. For example, the electronic device may perform the aforementioned procedure according to whether the user wears the electronic device.

Figure 5:
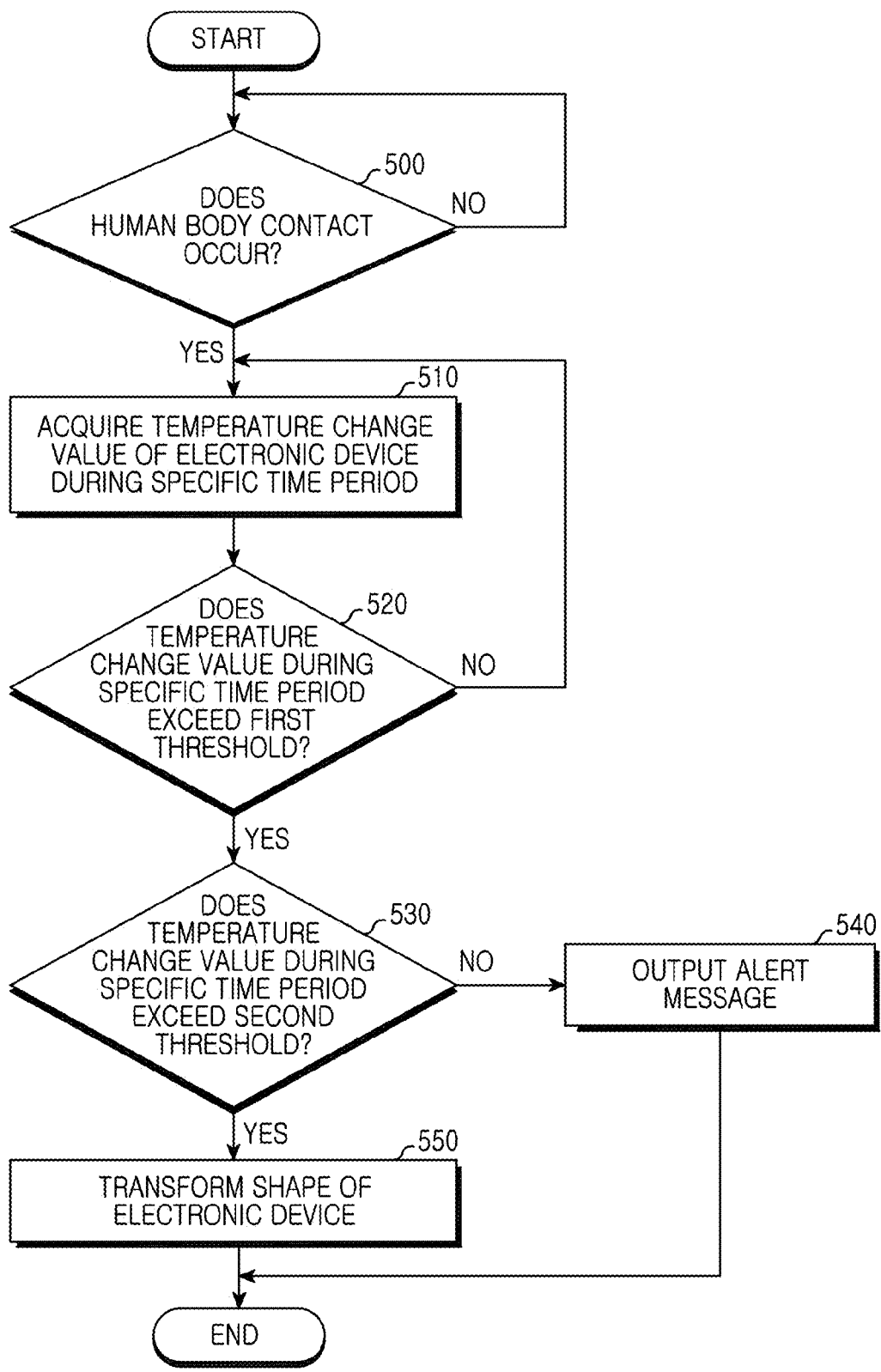
FIG. 5 illustrates a procedure for controlling a function in an electronic device by using a human body contact according to an embodiment of the present disclosure.

FIG. 5 illustrates a procedure for controlling a function in an electronic device by using a human body contact according to an embodiment of the present disclosure.

Referring to FIG. 5, the electronic device determines whether the human body contact occurs in operation 500. In this case, the electronic device may use an image sensor to determine whether the human body contact occurs. For example, the electronic device may capture an image pattern which is a feature of a part of a physical body of a user. The electronic device may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the electronic device may determine whether the human body contact occurs by using two or more body conductivity sensors. For example, if the electronic device is a wrist wearable type, the electronic device may measure a resistance by using two body conductivity sensors spaced apart by a specific distance from each other. The electronic device may determine whether the human body contact occurs, by confirming a resistance measurement value measured by using the body conductivity sensor.

As another example, the electronic device may determine whether the human body contact occurs, by combining at least two of a proximity sensor, an illumination sensor, a temperature sensor, and a humidity sensor. For example, the electronic device may use the proximity sensor to determine that an object exists nearby, and may determine whether the human body contact occurs by using the proximity sensor, the determination as to whether an object exists nearby, and/or the like. In addition, the electronic device may use the illumination sensor to measure an illumination at a time when the object is located nearby, and thus may determine whether the human body contact occurs. In addition, the electronic device may use the temperature or humidity sensor disposed at a portion which is in contact with a human body to recognize a measured temperature change or humidity change, and thus may determine whether the human body contact occurs. The electronic device may determine whether the human body contact occurs by combining at least one of the aforementioned sensors. However, various embodiments of the present disclosure are not limited thereto, and thus various methods to determine whether the human body contact occurs may be provided.

If the human body contact occurs, the electronic device acquires a temperature change value of the electronic device during a specific time period in operation 510. In this case, the electronic device may use a temperature sensor or thermometer disposed at a position which is in contact with the human body and thus may acquire a temperature change value.

In operation 520, the electronic device determines whether the temperature change value during the specific time period exceeds a first threshold.

If the temperature change value during the specific time period exceeds the first threshold, the electronic device may determine whether the temperature change value during the specific time period exceeds a second threshold in operation 530. For example, the electronic device may determine whether the temperature change value during the specific time period of FIG. 10 exceeds a second threshold 1020.

If the temperature change value during the specific time period does not exceed the second threshold, the electronic device may output an alert message and/or the like in operation 540. In this case, the electronic device may output the alert message in various manners. For example, the electronic device may generate and/or emit a high-pitched sound (for the user to hear), may provide a vibration, may display a popup message to a screen, and/or the like. As another example, the electronic device may output the alert message step by step. As another example, the electronic device may output the alert message by combining the aforementioned methods according to a situation.

If the temperature change value during the specific time period exceeds the second threshold, the electronic device transforms a shape of the electronic device in operation 550. In this case, the electronic device may be detached from the user, or a joining member of the electronic device may be released or a surface area of the electronic device may be increased. For example, if the electronic device has a shape of being wound around a wrist as shown in FIG. 11, the electronic device may transform the shape by using a bimetal attached to one side thereof. If the temperature change value during the specific time period is abnormally great, the bimetal of the electronic device may be bent or curved in a portion thereof, so that the electronic device can be detached or separated from the user.

As another example, if the electronic device includes two joining members 1210 and 1220 disposed at both sides of a main body portion 1200 as shown in FIG. 12, the electronic device may be detached or separated from the user by releasing a function of at least one joining member 1210 or 1220. If the temperature change value during the specific time period is abnormally great, the joining members 1210 and 1220 may detach or separate the electronic device from the user with an elastic force using an object such as a spring, a clip, a rubber, and/or the like.

FIG. 13 illustrates a structure for changing a shape of an electronic device by using temperature information in the electronic device according to an embodiment of the present disclosure.

Referring to FIG. 13, the electronic device may transform at least a portion of the electronic device. If the temperature change value during the specific time period is abnormally great, the electronic device may change at least a portion of the electronic device into an uneven shape to increase a surface area. In this case, the electronic device may decrease an area which is in contact with the user and increase an area which is in contact with the air to decrease an influence of a heat generation source.

Although it is described in various embodiments of the present disclosure that the electronic device controls the function according to whether the human body contact occurs, various embodiments of the present disclosure are not limited thereto. For example, the electronic device may perform the aforementioned procedure according to whether the user wears the electronic device.

Figure 6:
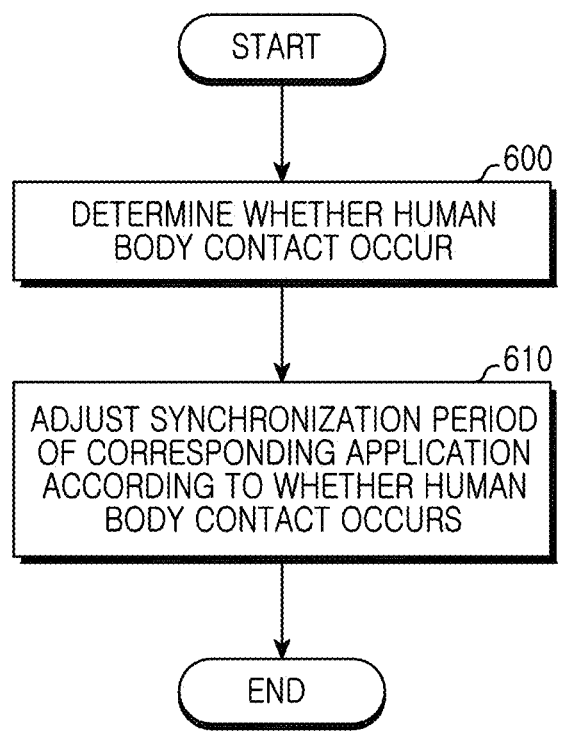
FIG. 6 illustrates a procedure for controlling a function in an electronic device by using a human body contact according to an embodiment of the present disclosure.

FIG. 6 illustrates a procedure for controlling a function in an electronic device by using a human body contact according to an embodiment of the present disclosure.

Referring to FIG. 6, the electronic device determines whether the human body contact occurs in operation 600. In this case, the electronic device may use an image sensor to determine whether the human body contact occurs. For example, the electronic device may capture an image pattern which is a feature of a part of a physical body of a user. The electronic device may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the electronic device may determine whether the human body contact occurs by using two or more body conductivity sensors. For example, if the electronic device is a wrist wearable type, the electronic device may measure a resistance by using two body conductivity sensors spaced apart by a specific distance from each other. The electronic device may determine whether the human body contact occurs, by confirming a resistance measurement value measured by using the body conductivity sensor.

As another example, the electronic device may determine whether the human body contact occurs, by combining at least two of a proximity sensor, an illumination sensor, a temperature sensor, and a humidity sensor. For example, the electronic device may use the proximity sensor to determine that an object exists nearby, and may determine whether the human body contact occurs by using the proximity sensor, the determination as to whether an object exists nearby, and/or the like. In addition, the electronic device may use the illumination sensor to measure an illumination at a time when the object is located nearby, and thus may determine whether the human body contact occurs. In addition, the electronic device may use the temperature or humidity sensor disposed at a portion which is in contact with a human body to recognize a measured temperature change or humidity change, and thus may determine whether the human body contact occurs. The electronic device may determine whether the human body contact occurs by combining at least one of the aforementioned sensors. However, various embodiments of the present disclosure are not limited thereto, and thus various methods to determine whether the human body contact occurs may be provided.

In operation 610, the electronic device adjusts a synchronization period of a corresponding application according to whether the human body contact occurs. For example, if the electronic device is in contact with the human body, the electronic device may set a synchronization period to be short as to an application such as an address book, a memo, an RSS news, an SNS, a push message, and the like. In addition, if the electronic device is not in contact with the human body, the electronic device may set the synchronization period to be long as to the aforementioned applications.

As another example, if the electronic device is in contact with the human body, the electronic device may set a synchronization period to be long as to an application such as an application update program, a memory clean program, a vaccine program, and/or the like. In addition, if the electronic device is not in contact with the human body, the electronic device may set the synchronization period to be short as to the aforementioned applications.

For another example, the electronic device may select an application of which a synchronization period is adjusted. In this case, the electronic device may allow the synchronization period to be adjusted only for a desired application.

As described above, the electronic device can effectively manage a resource of a battery, CPU, and memory of the electronic device by regulating a synchronization period for an application according to whether the human body contact occurs.

Although it is described in various embodiments of the present disclosure that the electronic device controls the function according to whether the human body contact occurs, various embodiments of the present disclosure are not limited thereto. For example, the electronic device may perform the aforementioned procedure according to whether the user wears the electronic device.

Figure 7:
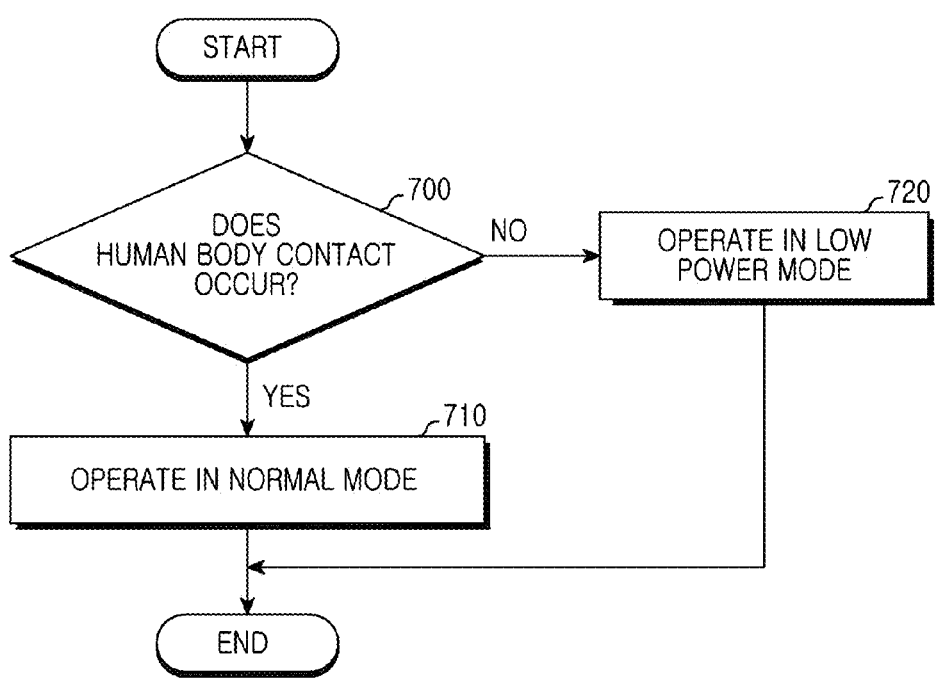
FIG. 7 illustrates a procedure for controlling a function in an electronic device by using a human body contact according to an embodiment of the present disclosure.

FIG. 7 illustrates a procedure for controlling a function in an electronic device by using a human body contact according to an embodiment of the present disclosure.

Referring to FIG. 7, the electronic device determines whether the human body contact occurs in operation 700. In this case, the electronic device may use an image sensor to determine whether the human body contact occurs. For example, the electronic device may capture an image pattern which is a feature of a part of a physical body of a user. The electronic device may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the electronic device may determine whether the human body contact occurs by using two or more body conductivity sensors. For example, if the electronic device is a wrist wearable type, the electronic device may measure a resistance by using two body conductivity sensors spaced apart by a specific distance from each other. The electronic device may determine whether the human body contact occurs, by confirming a resistance measurement value measured by using the body conductivity sensor.

As another example, the electronic device may determine whether the human body contact occurs, by combining at least two of a proximity sensor, an illumination sensor, a temperature sensor, and a humidity sensor. For example, the electronic device may use the proximity sensor to determine that an object exists nearby, and may determine whether the human body contact occurs by using the proximity sensor, the determination as to whether an object exists nearby, and/or the like. In addition, the electronic device may use the illumination sensor to measure an illumination at a time when the object is located nearby, and thus may determine whether the human body contact occurs. In addition, the electronic device may use the temperature or humidity sensor disposed at a portion which is in contact with a human body to recognize a measured temperature change or humidity change, and thus may determine whether the human body contact occurs. The electronic device may determine whether the human body contact occurs by combining at least one of the aforementioned sensors. However, various embodiments of the present disclosure is not limited thereto, and thus various methods may exist to determine whether the human body contact occurs.

If the human body contact occurs, the electronic device operates in a normal mode in operation 710. The normal mode may include a case of performing at least one operation for providing a user convenience when the user manipulates the electronic device. For example, the electronic device may adjust a brightness of a screen (e.g., LCD) to be bright in the normal mode. As another example, the electronic device may increase the clock speed of a CPU in the normal mode so that a processing speed becomes fast. As another example, the electronic device may set an auto screen-off time to be long in the normal mode. As another example, the electronic device may set a vibration strength to be strong in the normal mode. However, various embodiments of the present disclosure are not limited thereto, and thus there methods for providing user convenience in the electronic device may be provided.

If the human body contact does not occur, the electronic device operates in a low power mode in operation 720. The low power mode may include a case where the electronic device performs at least one operation for decreasing power consumption. For example, the electronic device may adjust a brightness of the screen (e.g., LCD) to be dark in the low power mode. As another example, the electronic device may decrease the clock speed of a CPU in the low power mode so that a processing speed becomes slow. As another example, the electronic device may set an auto screen-off time to be short in the low power mode. As another example, the electronic device may set a sleep waiting time to be short in the low power mode. As another example, the electronic device may set a vibration strength to be weak in the low power mode. However, various embodiments of the present disclosure are not limited thereto, and thus various methods for effectively utilizing power of a battery in the electronic device may be provided.

Although it is described in various embodiments of the present disclosure that the electronic device controls the function according to whether the human body contact occurs, various embodiments of the present disclosure are not limited thereto. For example, the electronic device may perform the aforementioned procedure according to whether the user wears the electronic device.

Figure 8:
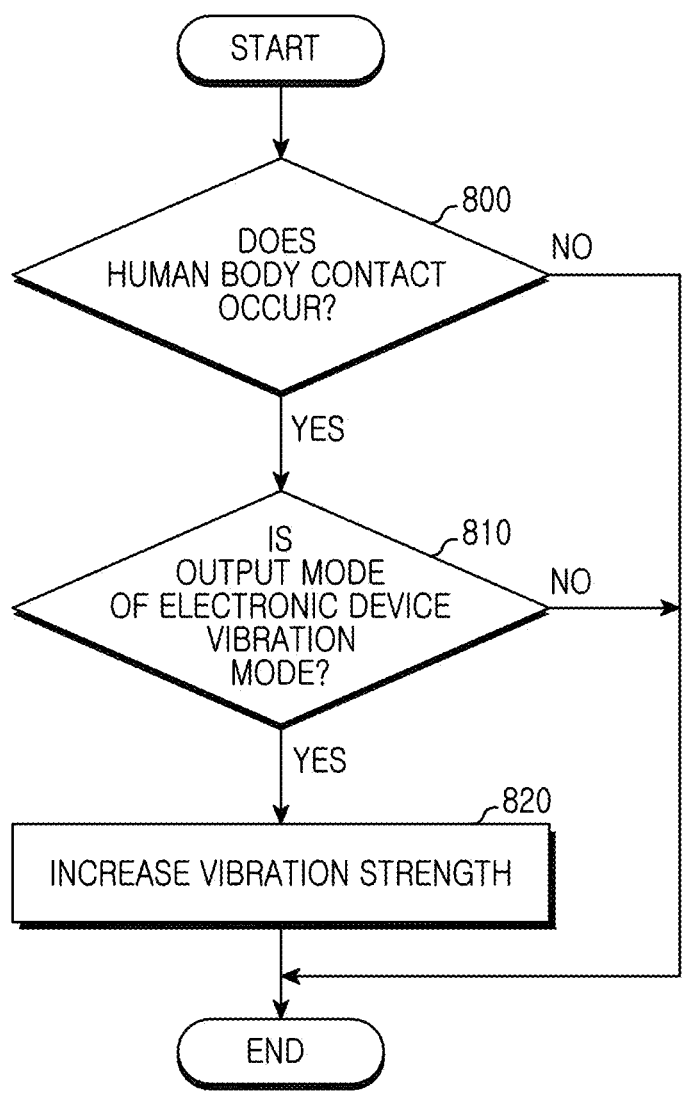
FIG. 8 illustrates a procedure for controlling a function in an electronic device by using a human body contact according to an embodiment of the present disclosure.

FIG. 8 illustrates a procedure for controlling a function in an electronic device by using a human body contact according to an embodiment of the present disclosure.

Referring to FIG. 8, the electronic device determines whether the human body contact occurs in operation 800. In this case, the electronic device may use an image sensor to determine whether the human body contact occurs. For example, the electronic device may capture an image pattern which is a feature of a part of a physical body of a user. The electronic device may compare the captured image pattern with a pre-stored reference image pattern to determine whether the electronic device is in contact with the human body. The image pattern may include at least one of a user's skin color, skin texture, body hair, sweat pore, pore arrangement, artery shape, iris, face image, and/or the like.

As another example, the electronic device may determine whether the human body contact occurs by using two or more body conductivity sensors. For example, if the electronic device is a wrist wearable type, the electronic device may measure a resistance by using two body conductivity sensors spaced apart by a specific distance from each other. The electronic device may determine whether the human body contact occurs, by confirming a resistance measurement value measured by using the body conductivity sensor.

As another example, the electronic device may determine whether the human body contact occurs, by combining at least two of a proximity sensor, an illumination sensor, a temperature sensor, and a humidity sensor. For example, the electronic device may use the proximity sensor to determine that an object exists nearby, and may determine whether the human body contact occurs by using the proximity sensor, the determination as to whether an object exists nearby, and/or the like. In addition, the electronic device may use the illumination sensor to measure an illumination at a time when the object is located nearby, and thus may determine whether the human body contact occurs. In addition, the electronic device may use the temperature or humidity sensor disposed at a portion which is in contact with a human body to recognize a measured temperature change or humidity change, and thus may determine whether the human body contact occurs. The electronic device may determine whether the human body contact occurs by combining at least one of the aforementioned sensors. However, various embodiments of the present disclosure are not limited thereto, and thus various methods to determine whether the human body contact occurs may be provided.

If the human body contact occurs, the electronic device determines whether an output mode of the electronic device is a vibration mode in operation 810. In this case, the electronic device may determine whether the output mode is a silent mode, a sound mode, or a vibration mode.

If the output mode of the electronic device is the vibration mode, the electronic device increases a vibration strength in operation 820. For example, the electronic device may increase a previous vibration strength to a pre-set vibration strength, or may increase a vibration strength by a specific vibration strength.

Although it is described in various embodiments of the present disclosure that the electronic device controls the function according to whether the human body contact occurs, the present disclosure is not limited thereto. For example, the electronic device may perform the aforementioned procedure according to whether the user wears the electronic device.

As described above, because an electronic device controls a corresponding function by using a human body contact, a low temperature burn risk and an explosion risk can be prevented, and a problem of a performance deterioration of the electronic device can be solved. In addition, power of the electronic device can be effectively utilized, and a user convenience can be improved when using the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a wearable device, the method comprising:
   determining, based on information sensed by a sensor module of the wearable device, whether a user of the wearable device is in contact with the wearable device; and
   switching, in response to determining that the user is in contact with the wearable device, a synchronization period of at least one application stored in the wearable device from a first period to a second period,
   wherein the synchronization period is a frequency updating data associated with the at least one application program such that the data associated with the at least one application program corresponds to other data associated with the at least one application program of an external electronic device, and
   wherein the second period is shorter than the first period.

2. The method of claim 1, further comprising:
   switching, in response to determining that the user is in non-contact with the wearable device, an operation mode of the wearable device from a normal power mode to a low power mode.

3. The method of claim 1, wherein the sensor module comprises one or more of a proximity sensor, a illumination sensor, a humidity sensor, or an image sensor of the wearable device.

4. The method of claim 1, further comprising:
   identifying, in response to determining that the user is in contact with the wearable device, whether an output mode of the wearable device is a vibration mode; and
   switching, in response to identifying that the output mode of the wearable device is the vibration mode, a vibration strength of the wearable device from a first strength to a second strength,
   wherein the second strength is greater than the first strength.

5. The method of claim 1, further comprising:
   measuring, in response to determining that the user is in contact with the wearable device, a temperature of the wearable device;
   controlling, in response to determining that the measured temperature is greater than or equal to a first threshold, to transform a shape of the wearable device such that the wearable device separated or detached from the user; and
   outputting, in response to determining that the measured temperature is less than the first threshold and is greater than a second threshold, an alert message.

6. The method of claim 5, wherein the shape of the wearable device is changed by controlling a bimetal disposed on a side of the wearable device.

7. The method of claim 1, further comprising:
   acquiring an image pattern by using an image sensor included in the sensor module,
   wherein the determining whether the user of the wearable device is in contact with the wearable device comprises:
   determining whether the user of the wearable device is in contact with the wearable device by comparing the acquired image pattern with a reference image pattern, and
   wherein the reference image pattern comprises one or more of a skin color, skin texture, body hair, sweat pore, pore arrangement, iris, or face image of the user.

8. The method of claim 1, further comprising:
   measuring, in response to determining that the user is in contact with the wearable device, a temperature change value of the wearable device during a specific period;
   controlling, in response to determining that the measured temperature change value is greater than or equal to a first threshold, to transform a shape of the wearable device such that the wearable device separated or detached from the user; and
   outputting, in response to determining that the measured temperature change value is less than the first threshold and is greater than a second threshold, an alert message.

9. A wearable device comprising:
   a sensor module;
   a memory; and
   a processor configured to:
   determine, based on information sensed by the sensor module of the wearable device, whether a user of the wearable device is in contact with the wearable devices, and
   switch, in response to determining that the user is in contact with the wearable device, a synchronization period of at least one application program stored in the wearable device from a first period to a second period,
   wherein the synchronization period is a frequency updating data associated with the at least one application program such that the data associated with the at least one application program corresponds to other data associated with the at least one application program of an external electronic device, and
   wherein the second period is shorter than the first period.

10. The wearable device of claim 9, wherein the processor is further configured to:
    switch, in response to determining that the user is in non-contact with the wearable device, an operation mode of the wearable device from a normal power mode to a low power mode.

11. The wearable device of claim 9, wherein the sensor module comprises one or more of a proximity sensor, a illumination sensor, a humidity sensor, or an image sensor of the wearable device.

12. The wearable device of claim 9, wherein the processor is further configured to:

identify, in response to determining that the user is in contact with the wearable device, whether an output mode of the wearable device is a vibration mode; and switch, in response to identifying that the output mode of the wearable device is the vibration mode, a vibration strength of the wearable device from a first strength to a second strength, wherein the second strength is greater than the first strength.

13. The wearable device of claim 9, wherein the processor is further configured to:

measure, in response to determining that the user is in contact with the wearable device, a temperature of the wearable device;

control, in response to determining that the measured temperature is greater than or equal to a first threshold, to transform a shape of the wearable device such that the wearable device is separated or detached from the user; and output, in response to determining that the measured temperature is less than the first threshold and is greater than a second threshold, an alert message.

14. The wearable device of claim 13, wherein the shape of the wearable device is changed by controlling a bimetal disposed on a side of the wearable device.

15. The wearable device of claim 9, wherein the processor is further configured to:

acquire an image pattern by using an image sensor included in the sensor module, and determine whether the user of the wearable device is in contact with the wearable device by comparing the acquired image pattern with a reference image pattern, and wherein the reference image pattern comprises one or more of a skin color, skin texture, body hair, sweat pore, pore arrangement, iris, or face image of the user.

16. The wearable device of claim 9, wherein the processor is further configured to:

measure, in response to determining that the user is in contact with the wearable device, a temperature change value of the wearable device during a specific period;

control, in response to determining that the measured temperature change value is greater than or equal to a first threshold, to transform a shape of the wearable device such that the wearable device is separated or detached from the user; and output, in response to determining that the measured temperature change value is less than the first threshold and is greater than a second threshold, an alert message.

17. A non-transient computer readable recording medium storing one or more programs including instructions for allowing a wearable device to perform a method of claim 1, when executed by the wearable device.

* * * * *